(12) United States Patent
Smelyanskiy et al.

(10) Patent No.: US 11,256,977 B2
(45) Date of Patent: Feb. 22, 2022

(54) LOWERING HARDWARE FOR NEURAL NETWORKS

(71) Applicant: Facebook, Inc., Menlo Park, CA (US)

(72) Inventors: Mikhail Smelyanskiy, Burlingame, CA (US); Abdulkadir Utku Diril, Menlo Park, CA (US); Jong Soo Park, Mountain View, CA (US); Nadav Rotem, Santa Clara, CA (US)

(73) Assignee: Facebook, Inc., Menlo Park, CA (US)

(*) Notice: Subject to any disclaimer, the term of this patent is extended or adjusted under 35 U.S.C. 154(b) by 1053 days.

(21) Appl. No.: 15/857,909

(22) Filed: Dec. 29, 2017

(65) Prior Publication Data
US 2019/0205735 A1 Jul. 4, 2019

(51) Int. Cl.
G06N 3/02 (2006.01)
G06N 3/063 (2006.01)
G06N 3/08 (2006.01)
G06N 3/04 (2006.01)
G06F 17/16 (2006.01)

(52) U.S. Cl.
CPC ............ *G06N 3/063* (2013.01); *G06F 17/16* (2013.01); *G06N 3/04* (2013.01); *G06N 3/08* (2013.01)

(58) Field of Classification Search
CPC ............ G06N 3/063; G06N 3/04; G06N 3/08; G06N 3/02–105; G06N 7/04–046; G06F 17/16

USPC ............................................. 706/1–9, 15–44
See application file for complete search history.

(56) References Cited

U.S. PATENT DOCUMENTS

2019/0179870 A1* 6/2019 Bannon .................. G06F 17/16

OTHER PUBLICATIONS

Alexander Matthes, René Widera, Erik Zenker, Benjamin Worpitz, Axel Huebl, Michael Bussmann, Tuning and optimization for a variety of many-core architectures without changing a single line of implementation code using the Alpaka library, arXiv: 1706.10086, 2017 (Year: 2017).*

(Continued)

*Primary Examiner* — Jue Louie
(74) *Attorney, Agent, or Firm* — FisherBroyles, LLP

(57) ABSTRACT

A disclosed computing system may include a special-purpose hardware device having an input subsystem, a linearization subsystem, and a matrix multiplication unit. The input subsystem may facilitate on-the-fly convolution lowering within a neural network convolution layer by directing input volume patches to logical unit(s) of the device. The linearization subsystem may be configured to receive a patch from the input subsystem and to linearize the patch by arranging elements of the patch as a portion of a data matrix row. The matrix multiplication unit of device may be configured to receive the data matrix from the linearization subsystem and to apply a filter matrix to the data matrix via a matrix multiplication operation. Various other methods, systems, and computer-readable media are also disclosed.

20 Claims, 8 Drawing Sheets

(56) References Cited

OTHER PUBLICATIONS

James E. Bennett, Michael J. Flynn, Reducing Cache Miss Rates Using Prediction Caches, Stanford University, 1996 (Year: 1996).*

Yang et al. "A Systemic Approach to Blocking Convolutional Neural Networks", Jun. 2016, retrieved from: https://arxiv.org/abs/1606.04209.*

Lu et al. "Evaluating Fast Algorithms for Convolutional Neural Networks on FPGAs", May 2017, 2017 IEEE 25th Annual International Symposium on Field-Programmable Custom Computing Machines.*

Lin et al. "Unrolled Memory Inner-Products: An abstract GPU Operator for Efficient Vision-Related Computations", Oct. 2017, 2017 IEEE International Conference on Computer Vision.*

* cited by examiner

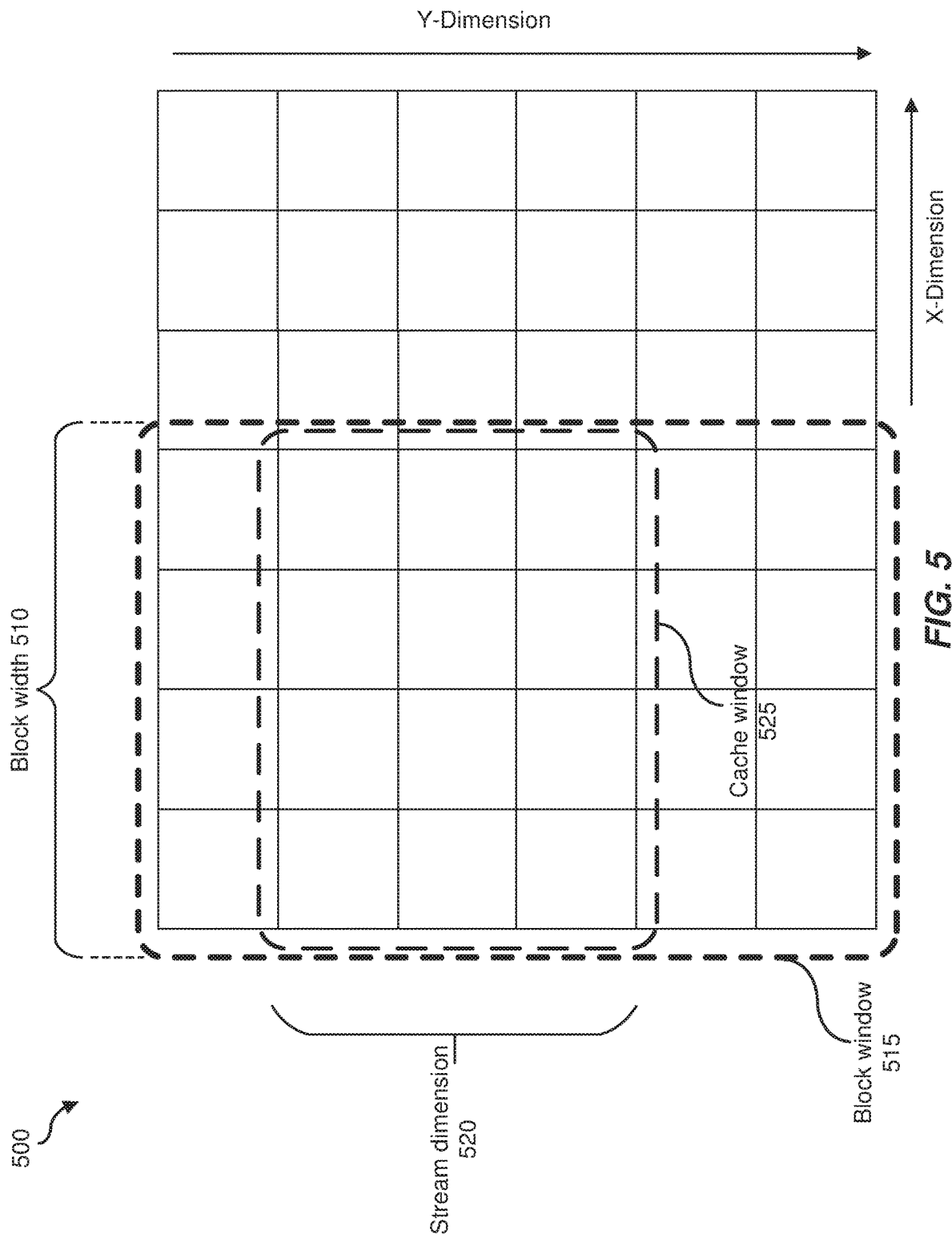

LOWERING HARDWARE FOR NEURAL NETWORKS

BACKGROUND

Artificial intelligence (AI) can enable computers to perform increasingly complicated tasks, particularly tasks related to cognitive functions associated with humans. Several approaches to AI are prevalent, including machine learning (ML) techniques. In ML, a computer may be programmed to parse data, learn from the data, and make predictions from real world inputs. With ML, a computer may be trained using data to perform a task, rather than explicitly programmed with a particular algorithm for performing the task. One ML approach, referred to as artificial neural networks, was inspired by the interconnections of neurons in a biological brain.

Neural networks are modeled after neurons, using connected layers similar to connected neurons. Each layer may receive an input, process the input, and pass an output to the next layer until the final layer produces a final output. Each layer may also assign a weight to its input. For example, if a task involves identifying a particular object in an image, these weights may correspond to a probability that the input matches the particular object. While calculations performed at these various layers may be computationally intensive, the advent of dedicated processing units have made neural networks more feasible. For example, the use of specialized processing hardware has given rise to significant advancements in deep learning, which is essentially a large neural network with many or "deep" layers.

However, even with the use of specialized processing hardware, such as accelerators that perform the computations of each layer, deep learning may tax existing computing systems. For example, convolutional neural networks (CNNs or ConvNets), which are deep, feed-forward neural networks, are often used for computer vision to analyze visual imagery. In a CNN, the layers often include filters and weights that are applied to inputs and output to the next layer. These filters and weights are typically determined through training. While specialized processing units known as inference accelerators may be used to perform inference, which is the process of using a trained neural network to make predictions from a new input, inference accelerators (as well as training accelerators) may exhibit various bottlenecks that slow down overall performance.

SUMMARY

As will be described in greater detail below, the instant disclosure describes lowering of neural network convolutional layers to general matrix-to-matrix multiplication (GEMM) operations to utilize GEMM units of ML accelerators. For example, the systems and methods described herein may linearize matrices used in convolution layers on-the-fly to enable efficient and effective GEMM unit processing of the matrices. Embodiments of the instant disclosure may also implement caching algorithms, blocking algorithms, parallel channel processing and/or a variety of other AI accelerated techniques to provide efficient and effective hardware-based convolution lowering.

In some embodiments of the present disclosure, a computing system may include a special-purpose hardware device having an control subsystem, a linearization subsystem, and a matrix multiplication unit. The control subsystem may be configured to perform or facilitate on-the-fly convolution lowering within a neural network convolution layer by directing patches of an input volume to one or more logical units of a special-purpose hardware device. The linearization subsystem of the special-purpose hardware device may be communicatively coupled to the control subsystem and may be configured to receive a patch of the input volume from the input subsystem and linearize the patch of the input volume by arranging elements of the patch as at least a portion of a row of a data matrix. The matrix multiplication unit of the special-purpose hardware device may be communicatively coupled to the linearization subsystem and may be configured to receive the data matrix from the linearization subsystem and to apply a filter matrix to the data matrix via a matrix multiplication operation.

In some examples, the computing system may further include a convolution raising subsystem that may be communicatively coupled to the matrix multiplication unit and may be configured to receive a result of the matrix multiplication operation and to use the result of the matrix multiplication operation to create an output volume of the convolution layer. In some examples, the linearization subsystem may be configured to linearize a set of weight matrices of the convolution layer to create the filter matrix that is applied to the data matrix. The special-purpose hardware device may include a reuse cache and may be configured to store an element of the patch in the reuse cache for use in linearizing an additional patch of the input volume and to retrieve an element of the additional patch from the reuse cache when sending the additional patch to the linearization subsystem. Storing the element of the patch may include storing an identified element in the reuse cache. The identified element may be an element of the patch that is identified as an element of the additional patch.

In some examples, storing the element of the patch may include implementing a blocking scheme by identifying a block of elements that does not span a dimension of the patch that is perpendicular to a direction of convolution in the convolution layer and by caching the block of elements for use in linearizing multiple additional patches of the input volume. The multiple additional patches may include the additional patch.

In some examples, the computing system may be configured to replace the element of the patch with the element of the additional patch for use in a future linearization operation. The patch may include data of a first channel of the input volume. The linearization subsystem may be further configured to enable parallel processing of multiple channels of the input volume by receiving an additional patch from a second channel of the input volume and by linearizing the additional patch of the input volume by arranging elements of the additional patch as at least a portion of an additional row of the data matrix.

In other embodiments of the present disclosure, a special-purpose hardware accelerator may include a control subsystem, a linearization subsystem, and a matrix multiplication unit. The control subsystem may be configured to facilitate or perform on-the-fly convolution lowering within a convolution layer of a neural network by directing patches of an input volume to one or more logical units of a special-purpose hardware device. The linearization subsystem may be communicatively coupled to the input subsystem and may be configured to receive a patch of the input volume from the input subsystem and to linearize the patch of the input volume by arranging elements of the patch as at least a portion of a row of a data matrix. The matrix multiplication unit may be communicatively coupled to the linearization subsystem and may be configured to receive the data matrix from the linearization subsystem and to apply a filter matrix to the data matrix via a matrix multiplication operation.

In some examples, the hardware accelerator may further include a convolution raising subsystem communicatively coupled to the matrix multiplication unit and configured to receive a result of the matrix multiplication operation and to use the result of the matrix multiplication operation to create an output volume of the convolution layer. The linearization subsystem may be further configured to linearize a set of weight matrices of the convolution layer to create the filter matrix that is applied to the data matrix. The hardware accelerator may include a reuse cache configured to store an element of the patch in the reuse cache for use in linearizing an additional patch of the input volume and to retrieve an element of the additional patch from the reuse cache when sending the additional patch to the linearization subsystem.

In some examples, the control system may be configured to store the element of the patch by storing, for each element of the patch that is identified as an element of the additional patch, the identified element in the reuse cache, and may be configured to implement a blocking scheme to store the element of the patch by identifying a block of elements that does not span a dimension of the patch that is perpendicular to a direction of convolution in the convolution layer and by caching the block of elements for use in linearizing multiple additional patches of the input volume. The control system may be configured to replace the element of the patch with the element of the additional patch for use in a future linearization operation.

In some examples, the patch may include data of a first channel of the input volume. The linearization subsystem may be configured to enable parallel processing of multiple channels of the input volume by receiving an additional patch from a second channel of the input volume and by linearizing the additional patch of the input volume by arranging elements of the additional patch as at least a portion of an additional row of the data matrix.

Some implementations of the present disclosure may include a method. The method may include (1) facilitating or performing on-the-fly convolution lowering within a convolution layer of a neural network by directing patches of an input volume to one or more logical units of a special-purpose hardware device, (2) receiving a patch of the input volume from the input subsystem, (3) linearizing the patch of the input volume by arranging elements of the patch as at least a portion of a row of a data matrix, (4) receiving the data matrix from the linearization subsystem, and (5) applying a filter matrix to the data matrix via a matrix multiplication operation. Embodiments of the method may include a computer-readable storage medium having instructions that perform operations of the method when executed by a suitable hardware device.

In some examples, the method may further include receiving a result of the matrix multiplication operation and using the result of the matrix multiplication operation to create an output volume of the convolution layer, linearizing a set of weight matrices of the convolution layer to create the filter matrix that is applied to the data matrix, and/or storing at least one element of the patch in the reuse cache for use in linearizing an additional patch of the input volume; and retrieving the element of the additional patch from the reuse cache when sending the additional patch to the linearization subsystem. Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIG. 5 is a diagram showing a blocking scheme.

Figure 1:
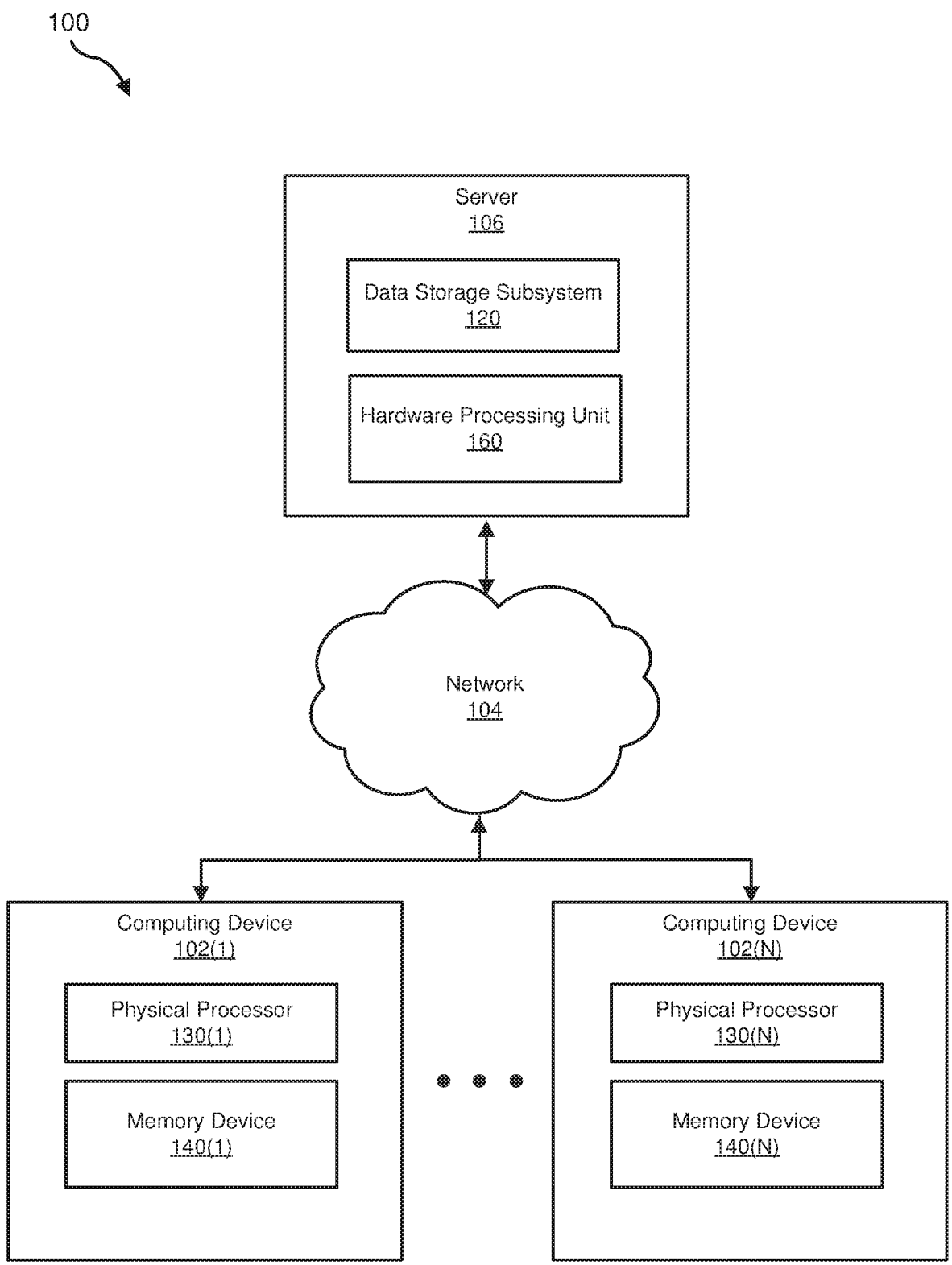
FIG. 1 is a block diagram of an exemplary system for lowering.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to implementing hardware-enabled lowering of convolution operations for neural networks using hardware support. Embodiments of the present disclosure may enable on-the-fly lowering of convolution operations in hardware accelerators, using logical units on a special-purpose hardware device, rather than software on a general-purpose computing system, to lower an input matrix on a patch-wise basis for processing in matrix multiplication units (e.g., GEMM units). Systems and methods described herein may also cache portions of input matrices in a reuse cache of a hardware accelerator to enable reuse of some matrix elements from patch to patch (or among sets of patches) and thereby reduce memory accesses. Various caching schemes may be implemented (e.g., full caching schemes that cache each element in a first patch that is also in a subsequent patch, blocking schemes that may involve a smaller cache size but more memory access, etc.). Furthermore, in some examples, patches of multiple images (e.g., red, green, and blue (RGB) channels of an input volume) may be processed in parallel as rows of an input matrix to be filtered by a GEMM unit. Embodiments of the present disclosure may also be implemented via a variety of other hardware and/or software configurations.

On-the-fly lowering of convolution operations and/or local caching of portions of input images may provide several advantages over traditional approaches to lowering.

For example, performing on-the-fly lowering in hardware may enable efficient pipelining of operations in hardware, may more fully utilize arithmetic units on some accelerators, and/or may not require the software buffers typically used in software-based lowering. In some embodiments, local caching on an accelerator may reduce extraneous accesses to local memory (e.g., static random-access memory (SRAM)), and blocking or other caching schemes may be used to balance SRAM access with cache size. In this way, embodiments of the present disclosure may accelerate computation, reduce memory usage, reduce energy consumption and heat generation, effectively utilize logical units of hardware accelerators, and/or provide a variety of other features and benefits in neural network processing.

Turning to the figures, the following will provide, with reference to FIG. 1, detailed descriptions of an exemplary network environment. The following also provides, with reference to FIGS. 2 and 3, a discussion of exemplary neural networks. The description of FIGS. 4A and 4B discuss aspects of lowering a convolution operation. The discussion of FIG. 5 presents a blocking scheme. The discussion of FIG. 7 presents an exemplary accelerator according to aspects of the present disclosure. The discussion of FIG. 6 covers a process for lowering using hardware support. The following also provides, with reference to FIG. 8, an example of a computing system with a CPU capable of implementing layer-level optimization.

FIG. 1 illustrates an exemplary network environment 100 (such as a social network environment) in which aspects of the present disclosure may be implemented. As shown, network environment 100 may include a plurality of computing devices 102(1)-(N), a network 104, and a server 106. Computing devices 102(1)-(N) may each represent a client device or a user device, such a desktop computer, laptop computer, tablet device, smartphone, or other computing device. Each of computing devices 102(1)-(N) may include a physical processor (e.g., physical processors 130(1)-(N)), which may represent a single processor or multiple processors, and a memory device (e.g., memory devices 140(1)-(N)), which may store instructions (e.g., software applications) or data.

Computing devices 102(1)-(N) may be communicatively coupled to server 106 through network 104. Network 104 may be any communication network, such as the Internet, a Wide Area Network (WAN), or a Local Area Network (WAN), and may include various types of communication protocols and physical connections.

As with computing devices 102(1)-(N), server 106 may represent a single server or multiple servers (e.g., a data center). Server 106 may host a social network or may be part of a system that hosts the social network. Server 106 may include a data storage subsystem 120, which may store instructions as described herein, and a hardware processing unit 160, which may include one or more processors and data storage units used for performing inference calculations for layers of a neural network. In some examples, the term "inference" generally refers to the process of causing a trained neural network to apply the learning gained from training to new data. Similarly, the term "training," in some examples, generally refers to the process of using a training dataset to teach a neural network new inference (e.g., classification) capabilities.

The terms "hardware processing unit" may, in some examples, refer to various types and forms of computer processors. In some examples, a hardware processing unit may include a central processing unit and/or a chipset corresponding to a central processing unit. Additionally or alternatively, a hardware processing unit may include a hardware accelerator (e.g., an AI accelerator, a video processing unit, a graphics processing unit, etc.) and may be implemented via one or more of a variety of technologies (e.g., an application-specific integrated circuit (ASIC), a field-programmable gate arrays (FPGA), etc.).

The term "special-purpose hardware" may, in some examples, refer to various types and forms of processors and other logical units and hardware elements that may be arranged, designed, or otherwise configured to perform one or more tasks more efficiently than general purpose computing systems (e.g., general purpose processors and/or memory devices). For example, some of the special-purpose hardware described herein may be configured to perform convolution lowering and/or matrix multiplication more efficiently and/or effectively than general purpose central processing units (CPUs).

As noted, server 106 may host a social network, and in such embodiments, computing devices 102(1)-(N) may each represent an access point (e.g., an end-user device) for the social network. In some examples, a social network may refer to any type or form of service that enables users to connect through a network, such as the Internet. Social networks may enable users to share various types of content, including web pages or links, user-generated content such as photos, videos, posts, and/or to make comments or message each other through the social network.

In some embodiments, server 106 may access data (e.g., data provided by computing devices 102(1)-(N)) for analysis. For example, server 106 may perform various types of machine learning tasks on data. For instance, server 106 may use machine learning algorithms to perform speech recognition (e.g., to automatically caption videos), to enable computer vision (e.g., to identify objects in images, to classify images, to identify action in video, to turn panoramic photos into interactive 360 images, etc.), in recommender systems (e.g., information filtering systems that predict user preferences), for facial recognition and human pose estimation, in document analysis, and/or to perform a variety of other tasks.

In addition to being applied in a variety of technical fields, embodiments of the instant disclosure may also be applied to numerous different types of neural networks. For example, the systems and methods described herein may be implemented in any AI scheme that is designed to provide brain-like functionality via artificial neurons. In some examples (e.g., recurrent neural networks and/or feed-forward neural networks), these artificial neurons may be non-linear functions of a weighted sum of inputs that are arranged in layers, with the outputs of one layer becoming the inputs of a subsequent layer.

Figure 2:
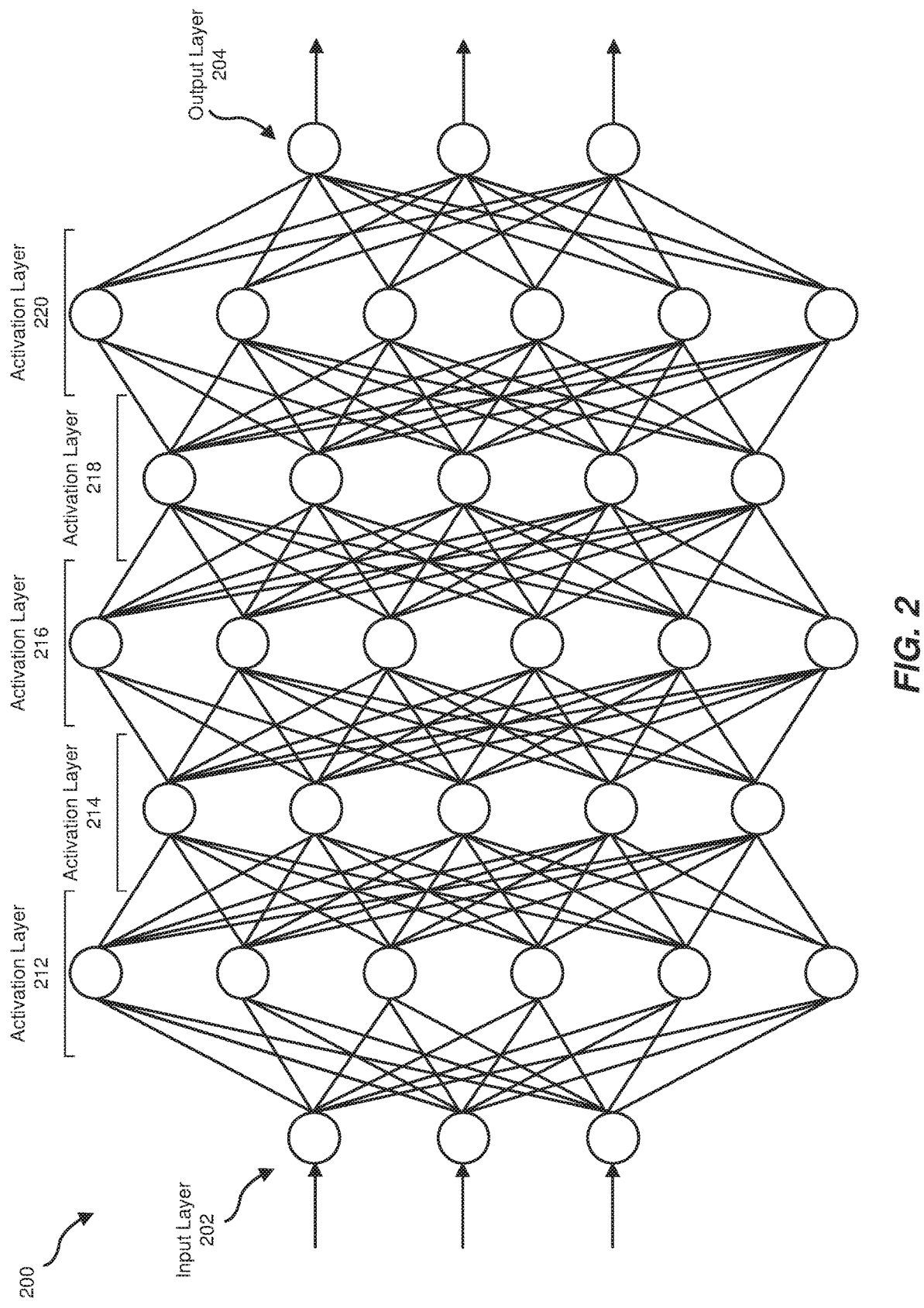
FIG. 2 is a diagram of nodes within an exemplary neural network.

FIG. 2 is a block diagram of an exemplary feed-forward neural network 200. Neural network 200 may include an input layer 202, an output layer 204, and a series of five activation layers-activation layer 212, activation layer 214, activation layer 216, activation layer 218, and activation layer 220. While FIG. 2 provides an example with five activation layers, neural network 200 may include any other suitable number of activation layers (e.g., one activation layer, dozens of activation layers, thousands of activation layers, etc.).

In the example shown in FIG. 2, data flows from input layer 202 through activation layers 212-220 to output layer 204 (i.e., from left to right). As shown, each value from the nodes of input layer 202 may be duplicated and sent to the nodes of activation layer 212. At activation layer 212, a set of weights (i.e., a filter) may be applied to the layer inputs, and each node may output a weighted sum to activation layer 214. This process may be repeated at each activation layer in sequence to create outputs at layer 204.

Figure 3:
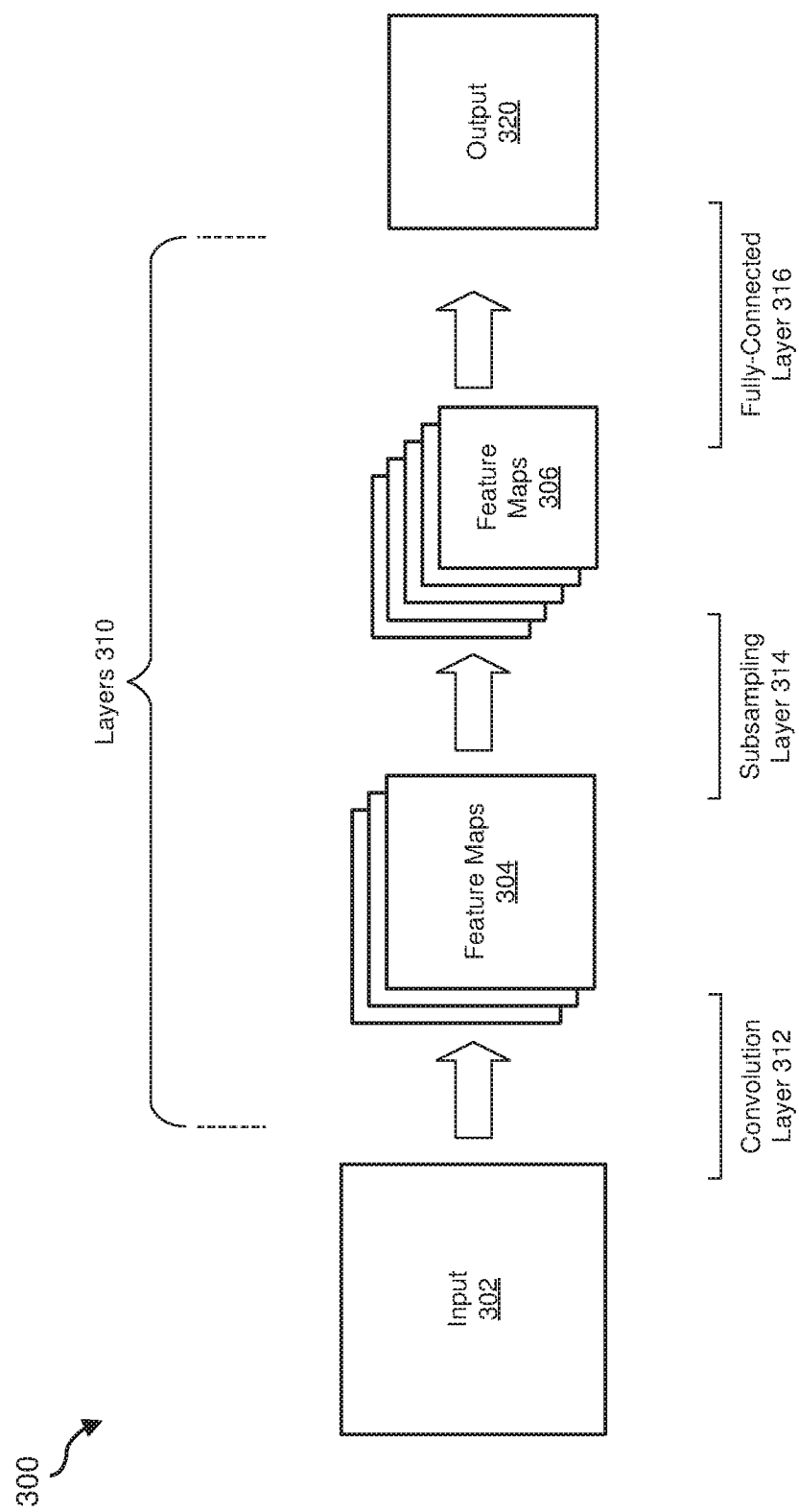
FIG. 3 is a block diagram of an exemplary CNN.

While FIG. 2 shows one way to conceptualize a neural network, there are a variety of other ways to illustrate and conceptualize neural networks. For example, FIG. 3 shows a neural network 300 with a variety of different types of layers 310 (some which may be fully connected feed-forward layers, such as those shown in FIG. 2). In convolution layer 312, an input 302 may undergo convolutional transformations, which may be calculated by hardware such as processing unit 160, accelerator 700, and/or processor 814 in FIGS. 7 and 8, respectively. For example, input 302 may undergo convolutions based on the filters and quantization parameters of convolution layer 312 to produce feature maps 304. In some embodiments, convolution layer 312 may also include a rectification sublayer (e.g., a rectified linear unit, or RELU) with an activation function.

FIG. 3 also shows that feature maps 304 output by convolution layer 312 may undergo subsampling (e.g., pooling), based on the filters and parameters of subsampling layer 314, to produce feature maps 306, which may be reduced-size feature maps. The convolution and subsampling of layers 312 and 314 may be performed a single time or multiple times before sending an output (e.g., feature maps 306) to a fully connected layer, such as fully connected layer 316. Fully connected layer 316, which FIG. 2 shows one example of, may process feature maps 306 to identify the most probable inference or classification for input 302 and may provide this classification or inference as output 320.

While embodiments of the instant disclosure may implement a CNN configured in the manner shown in FIG. 3, the systems and methods described herein may be implemented in any suitable type or form of neural networks whose activation layers may be a set of nonlinear functions of spatially nearby subsets of outputs of a prior layer. In other words, the hardware-based on-the-fly lowering discussed herein may be implemented in any type or form of neural network in which convolutions are performed to facilitate spatial and/or temporal subsampling.

Figure 4A:
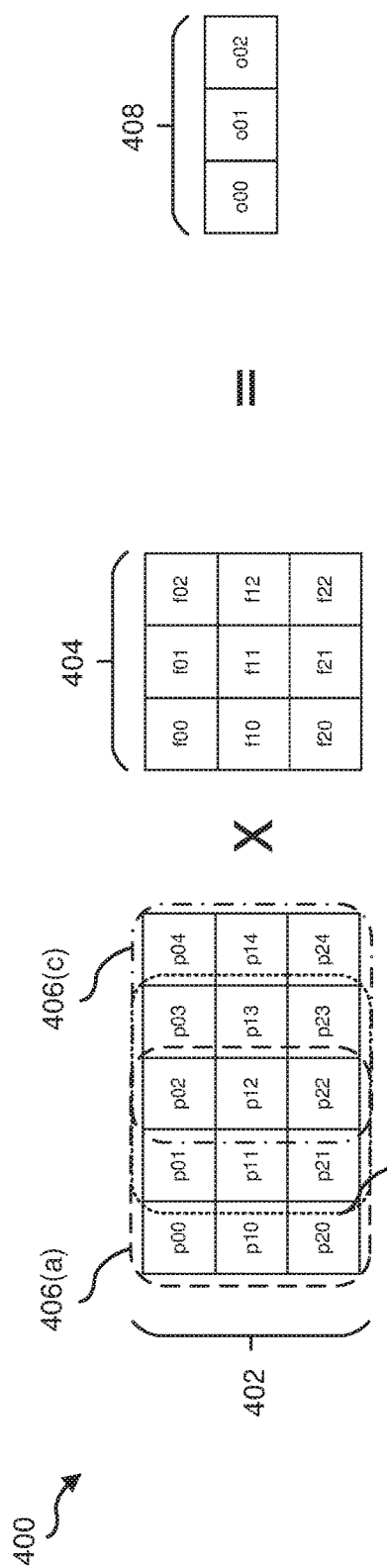
FIGS. 4A and 4B are diagrams depicting lowering of a convolution operation.

In neural networks, lowering convolutions for processing in GEMM units may provide a number of advantages and challenges relative to direct convolution. An example of direct convolution is provided in FIG. 4A, which shows a convolution 400 being performed on an input matrix. The input matrix of convolution 400 may be an input image that is digitally represented as an arrangement of pixels. While FIG. 4 shows a matrix of elements from an image, embodiments of the instant disclosure may also be applied to elements of any other suitable type or form of data. In other words, the term "element," in some embodiments, may refer to a unit of data that represents one or more sections, pieces, elements, or components of information.

As shown in FIG. 4A, an image may be digitally represented as a matrix, where each matrix element corresponds to a pixel value (which may correspond to color or a set of colors). In FIG. 4A, an input image 402 may be represented by pixels p00, p01, p02, p03, p04, p10, p11, p12, p13, p14, p20, p21, p22, p23, and p24 arranged in a 3×5 matrix. As shown, input image 402 may be convoluted by a filter map 404, represented by values f00, f01, f02, f10, f11, f12, f20, f21, and f22 arranged in a 3×3 matrix, to produce an output 408, represented by values o00, o01, and o02 arranged in a 1×3 matrix. Filter map 404 may be a weight matrix, or a matrix of weight values that have been determined through training of a neural network.

The convolution shown in FIG. 4A may be performed by sliding a filter window, corresponding to a size of the filter map 404. Sliding the filter window from left to right may specifically produce patch 406(*a*), patch 406(*b*), and patch 406(*c*). The windows around these patches conceptually represent samples of the input matrix having dimensions that are compatible with dimensions of filter map 404 for matrix operations. The elements (e.g., pixels) in patch 406(*a*) may be multiplied by filter map 404 to produce the first output value, o00. The filter window may then be shifted by a stride value. A stride value corresponds to a distance along a dimension of the input matrix to shift the filter window. The stride value may affect a number of samples taken and whether samples may have overlapping values. For convolution 400, the stride value may be 1, indicating that the filter window is shifted by 1 pixel. The next filter window of pixels, the filter window around patch 406(*b*), may then be multiplied by filter map 404 to produce the next output value, o01, and the next filter window, the filter window around patch 406(*c*) may be multiplied by filter map 404 to produce o02, and so on until the filter window has been shifted across the entire input image, in all dimensions. Although not shown in FIG. 4A, the filter window may also start at the left and be shifted down by the stride value, such as for larger input images or for padded input images, and repeated across the input image. The output may be the result of the convolution operation.

While convolution operations may be important components of deep neural networks, performing direct convolution operations may have some drawbacks. For example, even when performed in specialized convolution hardware (e.g., tensor processing units), direct convolutions may be less efficient than matrix multiplication operations. Furthermore, various traditional hardware accelerators may have GEMM units capable of efficiently and effectively performing matrix multiplication operations and may have other logical units capable of performing lowering operations.

As noted above, one option that may improve the efficiency of neural networks that rely on convolution is lowering, which may be a procedure of converting convolutions by essentially flattening them into a matrix on which matrix multiplication operations may be performed. Conventionally, lowering may be performed by lowering an entire input volume as well as an entire filter map. However, linearizing an entire input matrix (e.g., input image 402) may result in a linearized matrix that is larger than the original input matrix, requiring a non-trivial amount of storage (e.g., buffer space in RAM), especially when handling large input matrices. For example, traditional lowering processes may need, for a convolution with a filter of size F, a software buffer on the order of F^2 times the original input matrix size. Managing a buffer of this size may impact performance (e.g., due to increased overhead and power consumption) in a general-purpose computing device and may be impractical or impossible in memory-constrained AI accelerators.

Rather than linearizing the entire input volume, aspects of the present disclosure may perform on-the-fly lowering. In on-the-fly lowering, rather than linearizing the entire input volume, a system may only linearize a patch of the input volume on an as-needed basis (e.g., by streaming and/or caching portions of an input volume). For example, in FIG. 4A, rather than linearizing the entire input image 402, only a patch, such as the elements within the filter window of patch 406(*a*), may be linearized. As the convolution operation continues, input image 402 may be linearized a window (i.e., elements of a patch) at a time, such as patch 406(*b*)

next, followed by the filter window of patch 406(c), as prior filter windows finish processing.

In general, hardware lowering operations of the instant disclosure may involve linearizing matrices or submatrices (e.g., patches of a matrix) by converting them to and/or arranging them in a single row or column of a matrix multiplication operand to allow for matrix multiplication. In other words, linearizing may involve arranging elements into at least a portion of a row of a matrix. As an example, FIG. 4B shows how the matrices in FIG. 4A may be linearized and filtered in lowered convolution 410 that corresponds to direct convolution 400 in FIG. 4A.

Figure 4B:
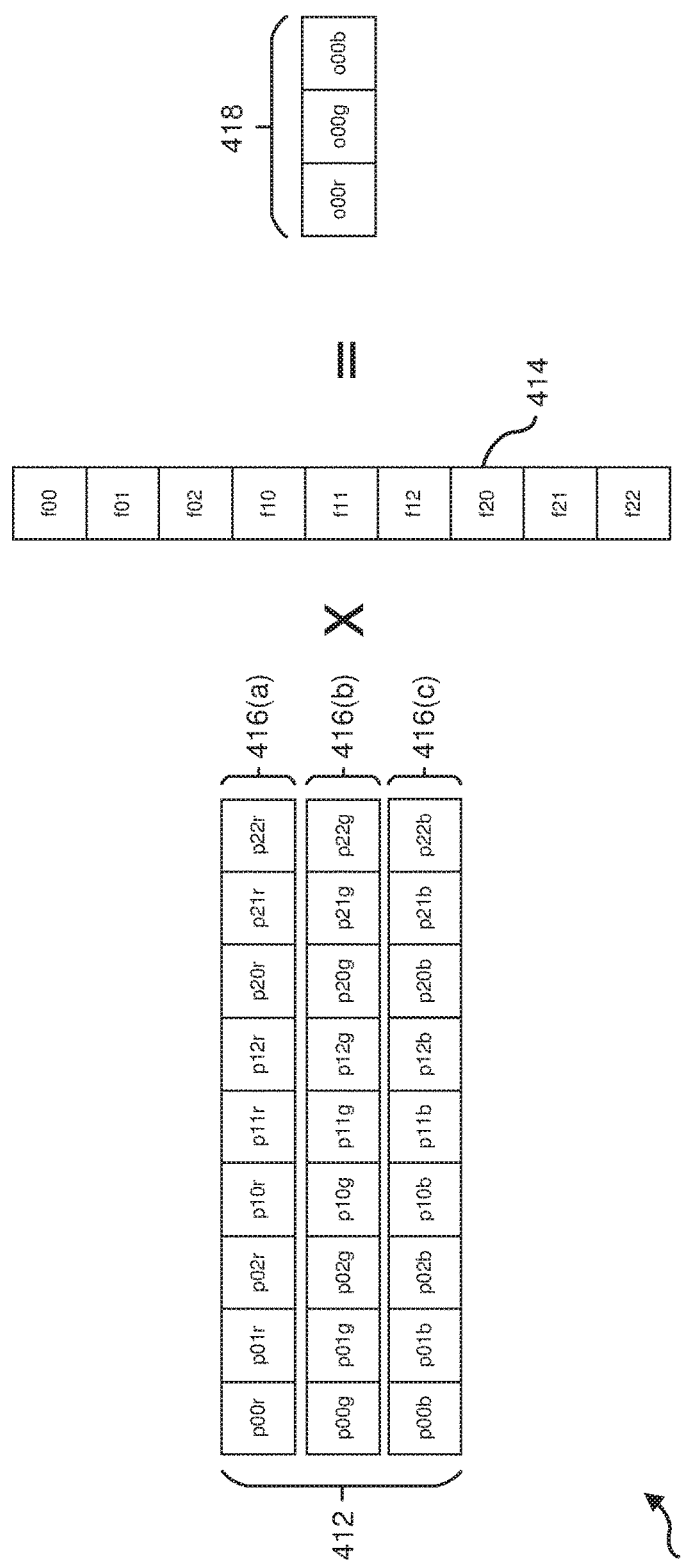

In FIG. 4B, lowered convolution 410 may achieve the same output as convolution 400 with the same input image, but may do so in a more efficient manner. For example, the process of calculating lowered convolution 410 may involve linearizing the samples in patch 406(a) to create row 416(a). The lowering process may also linearize the weights in filter map 404 to create linearized filter map 414. This linearization process may preserve stride values and other padding constraints of the original convolution and may also enable the use of GEMM units to perform matrix multiplication. Furthermore, the linearization process may be pipelined in-line with GEMM processing and/or may be performed as part of a GEMM processing algorithm.

The lowering operations described herein may be applied to various types of inputs, which may be referred to as "input volumes." Input volumes may include two-dimensional inputs, three-dimensional inputs, etc. For example, an input volume may correspond to a two-dimensional image having three channels, such as red, green, and blue, and may therefore be considered three-dimensional. Similarly, a corresponding filter map may be two-dimensional or three-dimensional. Furthermore, the term "patch," in some examples, may refer to a subset of an input volume. For example, a patch of an input 3D matrix may be a smaller matrix taken from one or more channels of the input 3D matrix.

Lowering may be applied to both 2D and 3D matrices. In FIG. 4B, a patch of an input volume may be linearized into data matrix 412. The patch may include, for instance, a single channel or multiple channels (e.g., three channels) of a 2D image. Thus, linearized channel row 416(a) may be a red channel derived from patch 406(a), linearized channel row 416(b) may be a green channel derived from patch 406(a), and linearized channel row 416(c) may be a blue channel derived from elements within patch 406(a). Data matrix 412, which may be an input matrix (i.e., an operand) for a matrix multiplication operation, may include one or more of linearized channel row 416(a), linearized channel row 416(b), and linearized channel row 416(c). In this manner, GEMM hardware (e.g., a 3×3 GEMM unit) may be effectively utilized (i.e., in contrast to processing a single stream or row of input at time, which may fail to fully use all of the operational power of a GEMM).

As noted, simultaneously processing across the channels may optimize (or at least partially optimize) hardware use, especially for three-channel images (e.g., RGB images) being processed by 3×3 GEMM units. In FIG. 4B, linearized filter map 414 may be applied, via a matrix multiplication operation, to each channel to produce output 418. Applying linearized filter map 414 to linearized channel row 416(a) produces output value o00r. Applying linearized filter map 414 to linearized channel row 416(b) produces output value o00g. Applying linearized filter map 414 to linearized channel row 416(c) produces output value o00b. Output 418 may be part of an output volume for the convolution layer and may be, in some examples "raised" by being combined with other outputs in a matrix to provide the same (or substantially similar) values that a direct convolution would provide. The term "output volume," in some examples, may refer to a transformed input volume, such as a result of convolving an input volume.

Although linearized filter map 414 includes a single column in FIG. 4B, lowering a convolution may involve lowering multiple filter maps by linearizing them into respective columns (or rows) of a matrix multiplication operand. For example, each filter map may be completely linearized into a column, and a set of columns may form a linearized filter matrix from a set of filter maps. In other words, multiple filter maps may correspond to filter maps for respective channels of an input volume such that the linearized filter matrix may have different columns corresponding to the different channels of the input volume. For a 3D filter map, the 3D filter map may be divided into sub-matrices, such as individual planes, and each sub-matrix may be linearized into a column and the linearized sub-matrix columns may be combined to form a linearized filter matrix.

As stated above, instead of buffering an entire lowered input matrix in RAM, embodiments of the present disclosure may perform on-the-fly lowering. In on-the-fly lowering, each patch of an input volume be streamed directly to one or more logical elements for linearizing. While performing on-the-fly lowering may reduce the need for buffering and caching, on-the-fly lowering may also involve accessing memory for each element of each patch that is processed.

In some embodiments, the systems and methods described herein may reduce memory reads by performing caching. For example, one or more elements of a lowered patch may be cached for later use in a reuse buffer. These elements may be retrieved from the reuse buffer, rather than being fetched from memory, when lowering a subsequent patch. As an example using input image 402 in FIG. 4A, when patch 406(a) is lowered, elements p01, p02, p11, p12, p21, and p22 may be cached for later use. Then, when patch 406(b) is to be lowered, elements p01, p02, p11, p12, p21, and p22 may be retrieved from the reuse buffer and elements p03, p13, and p23 may be retrieved from memory and cached. This caching scheme may be referred to as a full caching scheme, or a memory-access minimizing scheme, since each element shared between two sequentially processed patches may be cached and fetches from memory may be minimized.

In some embodiments, a blocking scheme may reduce the size of a cache needed in full caching while still reducing the volume of memory access involved in on-the-fly lowering without caching. In general, a blocking scheme may involve identifying a block of elements that does not span a dimension of the patch that is perpendicular to a direction of convolution in the convolution layer and caching the block of elements for use in linearizing multiple additional patches of the input volume. For example, in FIG. 5, a direction of convolution may be from left-to-right (e.g., along an x-axis, and a blocking scheme may select a subset of blocks along another dimension (e.g., by shifting a blocking window, or streaming, along a y-axis). In FIG. 5, this subset of blocks is represented by cache window 525, which may have a three-element wide stream dimension 520 along the y-axis and a four-element wide convolution dimension along the x-axis.

Embodiments of the present disclosure may implement various blocking schemes. For example, in a 1.5D blocking scheme, a block may include elements in a first dimension (along the x-axis) that are streamed through a second, streaming dimension 520 (along y-axis). For input image 500, a block width 510, along with a stream dimension 520, may define a block window 515. Block width 510 may be any suitable number of samples wide and may, for example, be determined or selected based on hardware constraints (e.g., the size of an available buffer or matrix operator) and/or a width of a convolution window. Block window 515 depicts elements that are streamed through stream dimension 520 for a given subset of input image 500. A cache window 525 shows which pixels may be cached at a given time. A size of cache window 525 may be determined to ensure sufficient pixels are available for multiplication with a lowered filter matrix. Thus, for a given column designation (e.g., block window 515), as calculations with pixels currently cached (e.g., cache window 525) are completed, additional pixels along the second dimension (y) are cached as cache window 525 slides downwards). Any suitable stride value (e.g., one element, two elements, three elements, etc.) may be used when sliding cache window 525 to a new position.

In some blocking schemes, after cache window 525 reaches a final row on block window 515, block window 515 may be shifted to the right by a designated stride value (e.g., a width of a filter window) to continue and cache window 525 may continue streaming from a top of this new position. In a 2.5D blocking scheme for a 3D input matrix, block planes may be defined along a first dimension (x) and a second dimension (y), and streamed through a third dimension (z).

Using a blocking scheme may change an access pattern for the pixels from an original access pattern, such as described with respect to FIG. 4A. In such embodiments, a hardware accelerator may track or otherwise take account of the access pattern such that writing to restore the original mapping when writing an output matrix.

Figure 6:
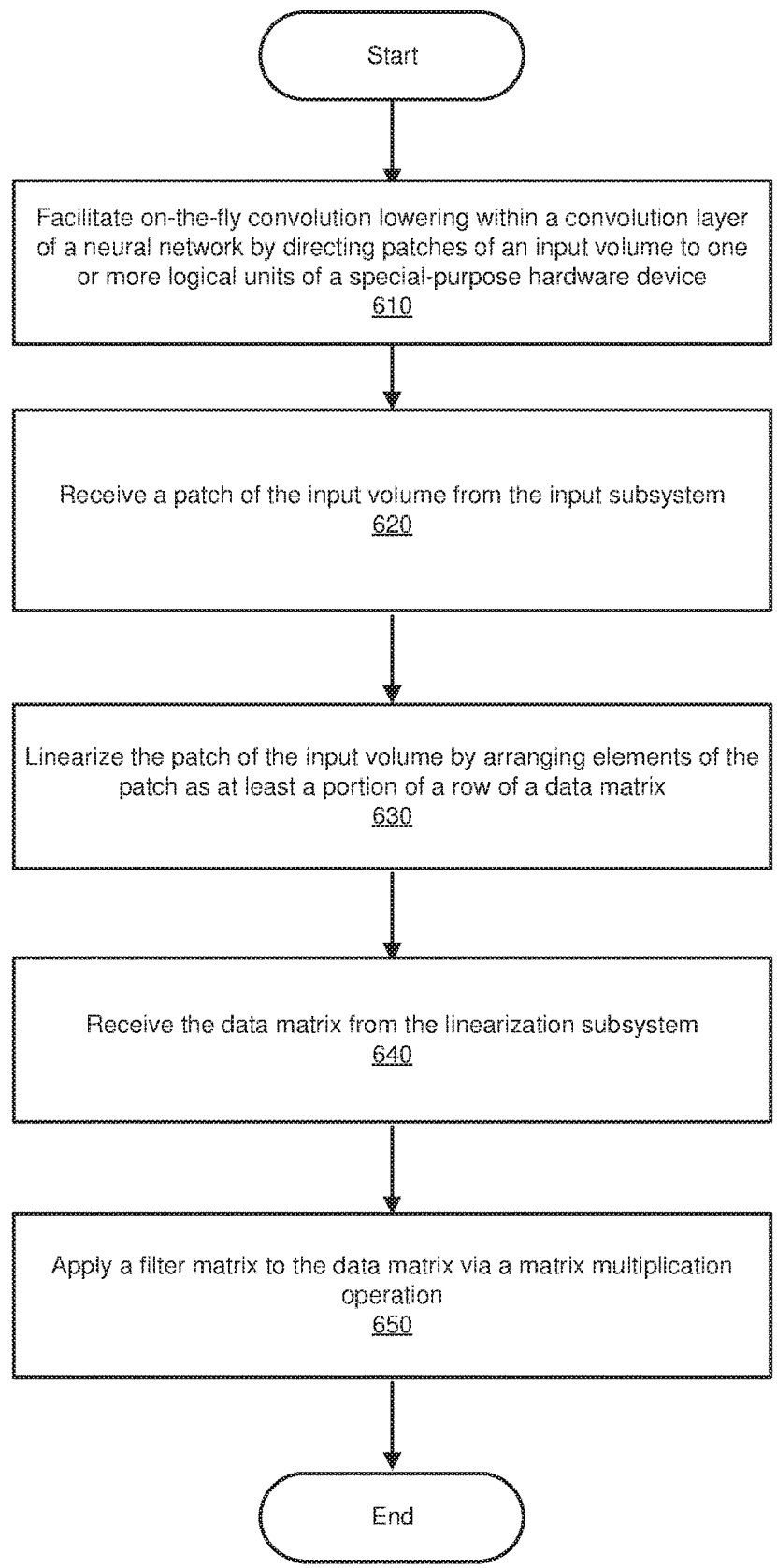
FIG. 6 is a flow diagram of an exemplary method for lowering using hardware support.
Figure 7:
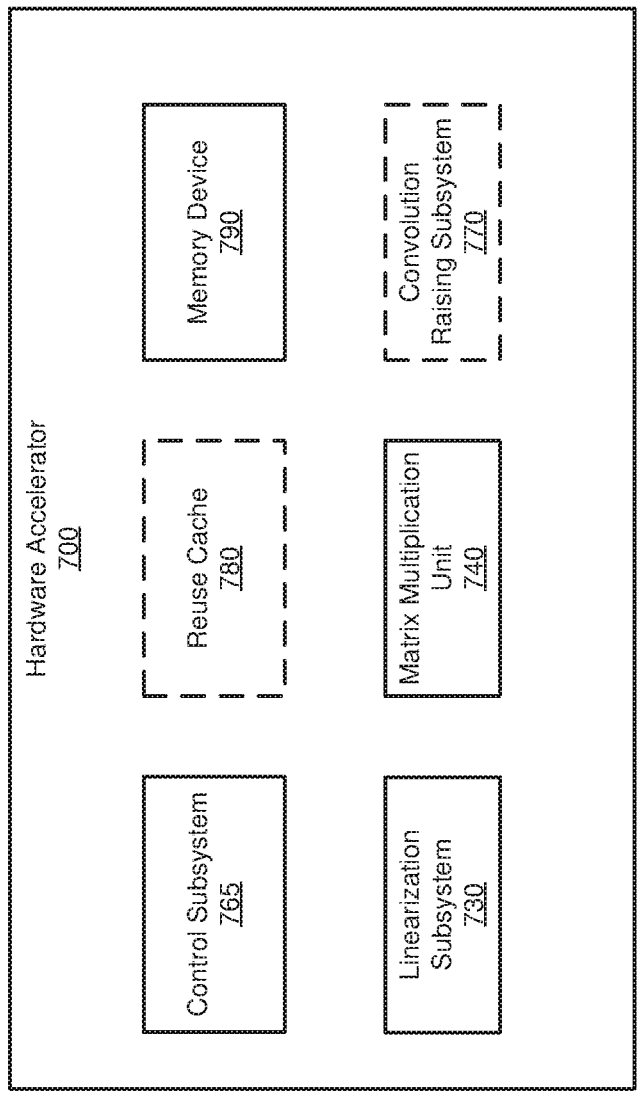
FIG. 7 is a block diagram of an exemplary accelerator configured for lowering.

FIG. 6 is a flow diagram of an exemplary computer-implemented method 600 for implementing lowering using hardware support. The steps shown in FIG. 6 may be performed by any suitable computer-executable code and/or computing system, including the system(s) illustrated in FIGS. 1, 7, and 8. In one example, each of the steps shown in FIG. 6 may represent an algorithm whose structure includes and/or is represented by multiple sub-steps, examples of which will be provided in greater detail below.

As illustrated in FIG. 6, at step 610 one or more of the systems described herein may facilitate on-the-fly convolution lowering within a convolution layer of a neural network by directing patches of an input volume to one or more logical units of a special-purpose hardware device. Directing patches to logical units may be performed by a variety of mechanisms. For example, a processor of a general-purpose computing device, such as processor 814 of computing system 810, may direct patches to lowering logic on an accelerator. Alternatively, all or a portion of the directing may be performed by input circuitry or control circuitry of a hardware accelerator, such as control subsystem 765 in hardware accelerator 700. In some examples, control subsystem 765 may include one or more processing units, processors, and/or other controller logic and/or input logic for coordinating operations of accelerator 700. Control subsystem 765 may be configured to (e.g., programmed to, hardwired to, etc.) facilitate on-the-fly convolution lowering.

In addition to being performed by a variety of mechanisms, directing patches to lowering hardware may be performed in a variety of different ways. For example, processor 814 of computing system 810 may direct the patches from a memory device (e.g., system memory 816, memory device 790) storing the input volume directly to the lowering hardware or to the lowering hardware by way of a cache of the accelerator, etc. Additionally or alternatively, control subsystem 765 may direct patches received at an input device of hardware accelerator 700 to logical units and/or a cache on hardware accelerator 700.

Returning to FIG. 6, at step 620 one or more of the systems described herein may receive a patch of the input volume from the input subsystem. The patch may be received in a variety of ways. For example, the lowering logic of an accelerator (e.g., linearization subsystem 730) may receive the patch as directed by software and/or by control subsystem 765. Receiving a patch may involve receiving elements within a filter window of a single channel of a volume, receives elements within the filter window of multiple channels of a volume, and/or receiving any other suitable sets or sets of matrix elements. Thus, linearization subsystem 730 may be configured to enable parallel processing of single or multiple channels of an input volume (e.g., by receiving and processing first, second and third patches of an RGB image).

At step 630, one or more of the systems described herein may linearize the patch of the input volume by arranging elements of the patch as at least a portion of a row of a data matrix. The patch may be linearized in a variety of ways. For example, linearization subsystem 730 of hardware accelerator 700 may rearrange the elements of the patch into a row, which may be combined with one or more additional patches of the same channel of an input volume for streaming into a matrix multiplication unit as an input matrix. Additional patches (e.g., from additional channels of an input volume) may be arranged into additional rows of the data matrix, respectively. In other words, each patch may be linearized into respective rows. As an example, linearization subsystem 730 may arrange elements of patch 406a into row 416a of data matrix 412, may arrange elements of patch 406(b) into row 416(b) of data matrix 412, and may arrange elements of patch 406(c) into row 416(c) of data matrix 412.

In certain implementations, in addition to linearizing a patch of an input volume, linearization subsystem 730 may linearize a set (e.g., one or more) of weight matrices of a convolution layer. In such embodiments, processor 814 and/or linearization subsystem 730 may play a role in directing a filter map (e.g., filter map 404) to linearization subsystem 730 to create all or a portion of a lowered filter map matrix, which may be used to weight a lowered input matrix (e.g., data matrix 412). Linearization subsystem 730 may, for example, linearize filter map 404 to create linearized filter map 414. In other implementations, the weight matrices may have been previously linearized and cached locally on hardware accelerator 700 in reuse cache 780 or memory device 790, or stored remoted from hardware accelerator 700 in a memory device.

Returning to FIG. 6, At step 640 one or more of the systems described herein may receive the data matrix from the linearization subsystem. The data matrix may be received in a variety of ways. For instance, control subsystem 765 may direct linearization subsystem 730 to provide data matrix 412 to a matrix multiplication unit, such as matrix multiplication unit 740 of hardware accelerator 700. Additionally or alternatively, linearization subsystem 730 may be arranged in-line with and/or as an integral part of matrix multiplication unit 740 such that linearization subsystem provides data matrix 412 directly to matrix multiplication logic without requiring external instruction (e.g., without requiring instruction from control subsystem 765).

In other words, linearizing patches of an input volume may be pipelined as an intermediate stage of matrix operations, which may introduce some latency but may not change the bandwidth requirements of an AI accelerator. For example, linearizing may be implemented as a restructuring of inputs to a GEMM. In such examples, data matrix 412 may not be cached but instead may be streamed directly from an output of linearization subsystem 730 to an input of matrix multiplication unit 740.

At step 650, one or more of the systems described herein may apply a filter matrix to the data matrix via a matrix multiplication operation. The filter matrix may be a filter map for the current convolution layer (e.g., filter map 404), and more specifically may be a linearized form of the filter map (e.g., linearized filter map 414). The filter matrix may be applied in a variety of ways. For instance, matrix multiplication unit 740 of hardware accelerator 700 may perform the matrix multiplication operation by performing dot product operations on rows of input data matrix 412 and columns of lowered, linearized filter map 414. In other words, matrix multiplication unit 740 may use input data matrix 412 and linearized filter map 414 as operands of a matrix multiplication operation.

In some embodiments, a result of the matrix multiplication may require further processing to complete a convolution layer. The additional processing, which may be referred to as "raising," may be performed on hardware accelerator 700 and/or by a processor 814. For example, output circuitry of hardware accelerator 700 may provide the output of matrix multiplication operations from matrix multiplication unit 740 to processor 814, which may perform convolution raising by processing one or more matrix multiplication outputs to create a convolution layer output. Alternatively, hardware accelerator 700 may include a convolution raising subsystem 770, which may receive the outputs from matrix multiplication unit 740 and process the outputs to create a convolution layer output, which may then be provided to another layer of a neural network.

As discussed above and shown in FIG. 7, hardware accelerator may include linearization subsystem 730, control subsystem 765, matrix multiplication unit 740, and memory device 790. Linearization subsystem 730 may be implemented in specially configured linearization logical units and/or may include logic from or be implemented by other logical units of an AI hardware accelerator (e.g., by convolutional units, such as tensor units). Linearization subsystem 730 may be communicatively coupled to control subsystem 765, matrix multiplication unit 740, and/or reuse cache 780. Matrix multiplication unit 740 may be a GEMM unit or other matrix calculation hardware (e.g., multiply-accumulate (MAC) units) capable of performing arithmetical operations for lowered convolutions. In addition to being communicatively coupled to linearization subsystem 730, matrix multiplication unit 740 may be communicatively coupled to control subsystem 765.

In embodiments in which hardware accelerator 700 implements a caching scheme (e.g., a blocking scheme), accelerator 700 may include convolution raising subsystem 770 and reuse cache 780 (these elements may be optional in other implementations). Convolution raising subsystem 770 may be a logic unit capable of performing operations to produce an output volume for a convolution layer. As with linearization subsystem 730, convolution raising subsystem 770 may be implemented in specially-configured linearization logical units and/or may include logic from or be implement by other logical units of an AI hardware accelerator (e.g., by convolutional units, such as tensor units).

Reuse cache 780 may be configured as all or a portion of a memory device, one or more registers or logical buffers, a cache that provides faster access than SRAM (e.g., memory device 790 may be an SRAM device), and/or any other type or form of data storage unit for use during training or inference operations of a neural network. For instance, reuse cache 780 may be used in full or blocking caching scheme for caching reusable elements of patches of an input volume. Reuse cache 780 may be specially designed and configured to store a particular number of matrix elements for certain caching or blocking schemes. Alternatively, reuse cache 780 may be all or part of an existing data storage subsystem of accelerator 700. In various examples, the phrase "data storage subsystem" generally refers to any type or combination of one or more data storage units, including registers, caches, memory devices, etc.

Control subsystem 765, reuse cache 780, and processor 814 may be components that enable any suitable blocking or caching algorithm, including the blocking algorithms discussed above in connection with FIG. 5. In various caching schemes, control subsystem 765 may be configured to cache elements for later use and replace the elements of patches that have been processed with the element of patches entering processing to keep the cache current and useful as convolution and/or blocking proceeds. Furthermore, caching control subsystem 765 may be configured to cache a single element of a patch, a single column of a patch, a single row of a patch, multiple elements, columns, or rows of a patch, and/or any other suitable number or block of elements from a patch.

Control subsystem 765 and/or processor 814 may implement a blocking scheme by identifying a block of elements that does not span a dimension of the first patch that is perpendicular to a direction of convolution in the convolution layer. For example, referencing FIG. 5, a block of elements along the x dimension does not span a dimension of the patch that is perpendicular to a direction of convolution (e.g., y dimension). For a 3D input volume, x-y planes may form the block of elements that do not span a dimension that is perpendicular to the direction of convolution (i.e., the z-dimension may be the dimension across channels that is perpendicular to the direction of convolution).

When implementing a blocking scheme, the patches may not be selected in an access pattern of a conventional convolution operation. As explained above, implementing the blocking scheme may deviate from a traditional convolution access pattern (e.g., left to right across an input matrix) by introducing an additional dimension of streaming. Thus, control subsystem 765, convolution raising subsystem 770 and/or processor 814 may be configured address the modified access patterns by taking them into account during raising operations when providing a convolution output. For example, creating a convolution output volume, which may be an input to a RELU layer, another convolution layer, a pooling layer, and/or a fully connected layer, may involve arranging results of blocking operations in appropriate locations in an output volume (e.g., locations that correspond to a location of the patches with respect to the input volume).

The lowering, linearization, raising, caching, and/or blocking systems of the instant disclosure may provide various advantages in neural networks implemented in both hardware accelerators and in neural networks running on general purpose processing units. For example, embodiments of the instant disclosure may leverage GEMM units and other AI accelerator hardware to perform efficient and effective convolution lowering and raising. Embodiments of the instant disclosure may also optimize GEMM usage, when performing on-the-fly lowering of convolutions with or without caching, by processing any suitable number of channels (e.g., three channels for a 3×3 GEMM) of an input volume in parallel. Embodiments of the instant disclosure may also minimize caching by maximizing streaming (and minimizing memory access) for accelerator hardware with limited or no caching capacity. Alternatively, embodiments of the instant disclosure may maximize caching and minimize streaming for accelerator hardware with sufficient caching capabilities and/or in situations where memory-access bandwidth is limited. Furthermore, in some embodiments, various types of block schemes may be implemented to balance caching and streaming anywhere between the minimized and maximized caching options.

While some of the examples of the instant disclosure have been discussed in the context of the inference stage of neural network operation, the systems and methods of the instant disclosure may also be applied to either or both of the training and the inference stages of neural network operation. In addition, lowering may be selectively applied to certain convolution operations or may be applied to all convolution operations. Moreover, the systems and methods of the instant disclosure may be applied to other instances requiring complex matrix operations, similar to that of convolution operations.

Figure 8:
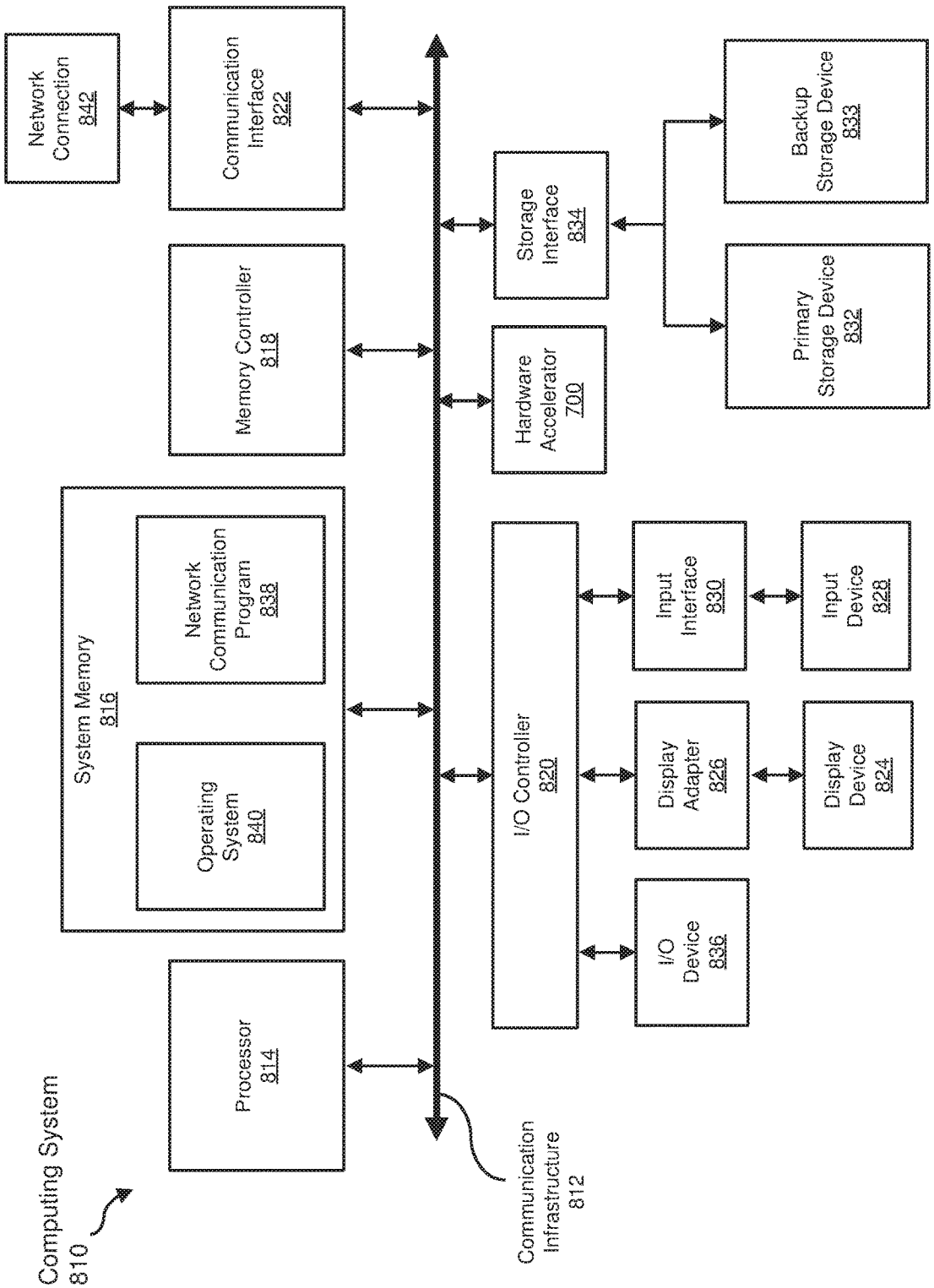
FIG. 8 is a block diagram of an example computing system capable of implementing one or more of the embodiments described and/or illustrated herein.

FIG. 8 is a block diagram of an example computing system 810 capable of implementing one or more of the embodiments described and/or illustrated herein. For example, all or a portion of computing system 810 may perform and/or be a means for performing, either alone or in combination with other elements, one or more of the steps described herein (such as one or more of the steps illustrated in FIG. 6). All or a portion of computing system 810 may also perform and/or be a means for performing any other steps, methods, or processes described and/or illustrated herein. In some embodiments, computing system 810 may include hardware accelerator 700, which may be interconnected with other elements of computing system 810 via communication infrastructure 812.

Computing system 810 broadly represents any single or multi-processor computing device or system capable of executing computer-readable instructions. Examples of computing system 810 include, without limitation, workstations, laptops, client-side terminals, servers, distributed computing systems, handheld devices, or any other computing system or device. In its most basic configuration, computing system 810 may include at least one processor 814 and a system memory 816.

Processor 814 generally represents any type or form of physical processing unit (e.g., a hardware-implemented central processing unit) capable of processing data or interpreting and executing instructions. In certain embodiments, processor 814 may receive instructions from a software application or module. These instructions may cause processor 814 to perform the functions of one or more of the example embodiments described and/or illustrated herein.

System memory 816 generally represents any type or form of volatile or non-volatile storage device or medium capable of storing data and/or other computer-readable instructions. Examples of system memory 816 include, without limitation, Random Access Memory (RAM), Read Only Memory (ROM), flash memory, or any other suitable memory device. Although not required, in certain embodiments computing system 810 may include both a volatile memory unit (such as, for example, system memory 816) and a non-volatile storage device (such as, for example, primary storage device 832, as described in detail below).

In some examples, system memory 816 may store and/or load an operating system 840 for execution by processor 814. In one example, operating system 840 may include and/or represent software that manages computer hardware and software resources and/or provides common services to computer programs and/or applications on computing system 810. Examples of operating system 840 include, without limitation, LINUX, JUNOS, MICROSOFT WINDOWS, WINDOWS MOBILE, MAC OS, APPLE'S IOS, UNIX, GOOGLE CHROME OS, GOOGLE'S ANDROID, SOLARIS, variations of one or more of the same, and/or any other suitable operating system.

In certain embodiments, example computing system 810 may also include one or more components or elements in addition to processor 814 and system memory 816. For example, as illustrated in FIG. 8, computing system 810 may include a memory controller 818, an Input/Output (I/O) controller 820, a communication interface 822, and an accelerator 860 each of which may be interconnected via a communication infrastructure 812. Communication infrastructure 812 generally represents any type or form of infrastructure capable of facilitating communication between one or more components of a computing device. Examples of communication infrastructure 812 include, without limitation, a communication bus (such as an Industry Standard Architecture (ISA), Peripheral Component Interconnect (PCI), PCI Express (PCIe), or similar bus) and a network.

Memory controller 818 generally represents any type or form of device capable of handling memory or data or controlling communication between one or more components of computing system 810. For example, in certain embodiments memory controller 818 may control communication between processor 814, system memory 816, and I/O controller 820 via communication infrastructure 812.

I/O controller 820 generally represents any type or form of module capable of coordinating and/or controlling the input and output functions of a computing device. For example, in certain embodiments I/O controller 820 may control or facilitate transfer of data between one or more elements of computing system 810, such as processor 814, system memory 816, communication interface 822, display adapter 826, input interface 830, and storage interface 834.

As illustrated in FIG. 8, computing system 810 may also include at least one display device 824 coupled to I/O controller 820 via a display adapter 826. Display device 824 generally represents any type or form of device capable of visually displaying information forwarded by display adapter 826. Similarly, display adapter 826 generally represents any type or form of device configured to forward graphics, text, and other data from communication infrastructure 812 (or from a frame buffer, as known in the art) for display on display device 824.

As illustrated in FIG. 8, example computing system 810 may also include at least one input device 828 coupled to I/O controller 820 via an input interface 830. Input device 828 generally represents any type or form of input device capable of providing input, either computer or human generated, to example computing system 810. Examples of input device 828 include, without limitation, a keyboard, a pointing device, a speech recognition device, variations or combinations of one or more of the same, and/or any other input device.

Additionally or alternatively, example computing system 810 may include additional I/O devices. For example, example computing system 810 may include I/O device 836. In this example, I/O device 836 may include and/or represent a user interface that facilitates human interaction with computing system 810. Examples of I/O device 836 include, without limitation, a computer mouse, a keyboard, a monitor, a printer, a modem, a camera, a scanner, a microphone, a touchscreen device, variations or combinations of one or more of the same, and/or any other I/O device.

Communication interface 822 broadly represents any type or form of communication device or adapter capable of facilitating communication between example computing system 810 and one or more additional devices. For example, in certain embodiments communication interface 822 may facilitate communication between computing system 810 and a private or public network including additional computing systems. Examples of communication interface 822 include, without limitation, a wired network interface (such as a network interface card), a wireless network interface (such as a wireless network interface card), a modem, and any other suitable interface. In at least one embodiment, communication interface 822 may provide a direct connection to a remote server via a direct link to a network, such as the Internet. Communication interface 822 may also indirectly provide such a connection through, for example, a local area network (such as an Ethernet network), a personal area network, a telephone or cable network, a cellular telephone connection, a satellite data connection, or any other suitable connection.

In certain embodiments, communication interface 822 may also represent a host adapter configured to facilitate communication between computing system 810 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 822 may also allow computing system 810 to engage in distributed or remote computing. For example, communication interface 822 may receive instructions from a remote device or send instructions to a remote device for execution.

In some examples, system memory 816 may store and/or load a network communication program 838 for execution by processor 814. In one example, network communication program 838 may include and/or represent software that enables computing system 810 to establish a network connection 842 with another computing system (not illustrated in FIG. 8) and/or communicate with the other computing system by way of communication interface 822. In this example, network communication program 838 may direct the flow of outgoing traffic that is sent to the other computing system via network connection 842. Additionally or alternatively, network communication program 838 may direct the processing of incoming traffic that is received from the other computing system via network connection 842 in connection with processor 814.

Although not illustrated in this way in FIG. 8, network communication program 838 may alternatively be stored and/or loaded in communication interface 822. For example, network communication program 838 may include and/or represent at least a portion of software and/or firmware that is executed by a processor and/or Application Specific Integrated Circuit (ASIC) incorporated in communication interface 822.

As illustrated in FIG. 8, example computing system 810 may also include a primary storage device 832 and a backup storage device 833 coupled to communication infrastructure 812 via a storage interface 834. Storage devices 832 and 833 generally represent any type or form of storage device or medium capable of storing data and/or other computer-readable instructions. For example, storage devices 832 and 833 may be a magnetic disk drive (e.g., a so-called hard drive), a solid state drive, a floppy disk drive, a magnetic tape drive, an optical disk drive, a flash drive, or the like. Storage interface 834 generally represents any type or form of interface or device for transferring data between storage devices 832 and 833 and other components of computing system 810.

In certain embodiments, storage devices 832 and 833 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 832 and 833 may also include other similar structures or devices for allowing computer software, data, or other computer-readable instructions to be loaded into computing system 810. For example, storage devices 832 and 833 may be configured to read and write software, data, or other computer-readable information. Storage devices 832 and 833 may also be a part of computing system 810 or may be a separate device accessed through other interface systems.

Many other devices or subsystems may be connected to computing system 810. Conversely, all of the components and devices illustrated in FIG. 8 need not be present to practice the embodiments described and/or illustrated herein. The devices and subsystems referenced above may also be interconnected in different ways from that shown in FIG. 8. Computing system 810 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 810. All or a portion of the computer program stored on the computer-readable medium may then be stored in system memory 816 and/or various portions of storage devices 832 and 833. When executed by processor 814, a computer program loaded into computing system 810 may cause processor 814 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 810 may be configured as an Application Specific Integrated Circuit (ASIC) adapted to implement one or more of the example embodiments disclosed herein.

The present disclosure provides hardware support, in an inference accelerator, for on-the-fly lowering of convolution operations, with caching based on a blocking scheme to improve memory usage. A portion of an input volume is cached based on the blocking scheme. A patch is selected from the cached portion based on a filter window corresponding to a filter map of the current convolution operation. The selected patch is linearized as part of the on-the-fly lowering and a weight matrix is applied to the linearized patch. Thus, convolution operations may be processed with GEMM units, which may increase processing efficiency. Local caching based on the blocking scheme may reduce a number of memory accesses, which may reduce power consumption.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

The term "memory device," as used herein, generally represents any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In addition, the term "physical processor," as used herein, generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive data, such as pixel values and/or filter matrix values to be transformed, transform the data, output a result of the transformation to store and be later accessed, use the result of the transformation as inputs to matrix multiplication units, and store the result of the transformation to output to a next convolutional layer. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computing system comprising:
   an input subsystem that performs on-the-fly convolution lowering within a neural network convolution layer by directing patches of an input volume to one or more logical units of a special-purpose hardware device;
   a linearization subsystem of the special-purpose hardware device that is communicatively coupled to the input subsystem and:
      receives a patch of the input volume from the input subsystem, and linearizes the patch of the input volume by arranging elements of the patch as at least a portion of a row of a data matrix;
a reuse cache of the special-purpose hardware device that stores at least one element of the patch for use in linearizing an additional patch of the input volume using a blocking scheme that modifies a convolution access pattern for accessing patches;
a matrix multiplication unit of the special-purpose hardware device that is communicatively coupled to the linearization subsystem and:
receives the data matrix from the linearization subsystem, and
applies a filter matrix to the data matrix via a matrix multiplication operation; and
a convolution raising subsystem communicatively coupled to the matrix multiplication unit and:
tracks the modified convolution access pattern;
receives a result of the matrix multiplication operation;
use the result of the matrix multiplication operation to create an output volume of the convolution layer; and
rearranges the result in the output volume to restore the original convolution access pattern.

2. The system of claim 1, wherein the linearization subsystem is configured to linearize a set of weight matrices of the convolution layer to create the filter matrix that is applied to the data matrix.

3. The system of claim 1, wherein the reuse cache is configured to:
retrieve an element of the additional patch from the reuse cache when sending the additional patch to the linearization subsystem.

4. The system of claim 3, wherein storing the element of the patch comprises storing an identified element in the reuse cache, wherein the identified element is an element of the patch that is identified as an element of the additional patch.

5. The system of claim 3, wherein storing the element of the patch comprises implementing the blocking scheme by:
identifying a block of elements that does not span a dimension of the patch that is perpendicular to a direction of convolution in the convolution layer; and
caching the block of elements for use in linearizing multiple additional patches of the input volume, wherein the multiple additional patches comprises the additional patch.

6. The system of claim 3, wherein the special-purpose hardware device is configured to replace the element of the patch with the element of the additional patch for use in a future linearization operation.

7. The system of claim 1, wherein:
the patch comprises data of a first channel of the input volume; and
the linearization subsystem is further configured to enable parallel processing of multiple channels of the input volume by:
receiving an additional patch from a second channel of the input volume, and
linearizing the additional patch of the input volume by arranging elements of the additional patch as at least a portion of an additional row of the data matrix.

8. The system of claim 1, wherein the linearization subsystem directly streams the data matrix to the matrix multiplication unit.

9. A special-purpose hardware accelerator comprising:
a control subsystem configured to facilitate on-the-fly convolution lowering within a convolution layer of a neural network by directing patches of an input volume to one or more logical units of a special-purpose hardware device;
a linearization subsystem that is communicatively coupled to the control subsystem and configured to:
receive a patch of the input volume from the control subsystem, and
linearize the patch of the input volume by arranging elements of the patch as at least a portion of a row of a data matrix;
a reuse cache of the special-purpose hardware device that stores at least one element of the patch for use in linearizing an additional patch of the input volume using a blocking scheme that modifies a convolution access pattern for accessing patches;
a matrix multiplication unit that is communicatively coupled to the linearization subsystem and configured to:
receive the data matrix from the linearization subsystem, and
apply a filter matrix to the data matrix via a matrix multiplication operation; and
a convolution raising subsystem communicatively coupled to the matrix multiplication unit and configured to:
track the modified convolution access pattern;
receive a result of the matrix multiplication operation;
use the result of the matrix multiplication operation to create an output volume of the convolution layer; and
rearrange the result in the output volume to restore the original convolution access pattern.

10. The special-purpose hardware accelerator of claim 9, wherein the linearization subsystem is further configured to linearize a set of weight matrices of the convolution layer to create the filter matrix that is applied to the data matrix.

11. The special-purpose hardware accelerator of claim 9, wherein the reuse cache is configured to:
retrieve an element of the additional patch from the reuse cache when sending the additional patch to the linearization subsystem.

12. The special-purpose hardware accelerator of claim 11, wherein the control subsystem is configured to store the element of the patch by storing, for each element of the patch that is identified as an element of the additional patch, the identified element in the reuse cache.

13. The special-purpose hardware accelerator of claim 11, wherein the control subsystem is configured to implement the blocking scheme to store the element of the patch by:
identifying a block of elements that does not span a dimension of the patch that is perpendicular to a direction of convolution in the convolution layer; and
caching the block of elements for use in linearizing multiple additional patches of the input volume, wherein the multiple additional patches comprises the additional patch.

14. The special-purpose hardware accelerator of claim 11, wherein the control subsystem is configured to replace the element of the patch with the element of the additional patch for use in a future linearization operation.

15. The special-purpose hardware accelerator of claim 11, wherein:
the patch comprises data of a first channel of the input volume; and the linearization subsystem is configured to enable parallel processing of multiple channels of the input volume by:
receiving an additional patch from a second channel of the input volume, and
linearizing the additional patch of the input volume by arranging elements of the additional patch as at least a portion of an additional row of the data matrix.

16. The special-purpose hardware accelerator of claim 9, wherein the linearization subsystem is configured to directly stream the data matrix to the matrix multiplication unit.

17. A method comprising:
facilitating on-the-fly convolution lowering within a convolution layer of a neural network by directing patches of an input volume to one or more logical units of a special-purpose hardware device;
receiving a patch of the input volume from an input subsystem;
storing, using a blocking scheme that modifies a convolution access pattern for accessing patches, at least one element of the patch in a reuse cache for use in linearizing an additional patch of the input volume, wherein a convolution raising subsystem tracks the modified convolution access pattern;
linearizing the patch of the input volume by arranging elements of the patch as at least a portion of a row of a data matrix;
receiving the data matrix at a matrix multiplication subsystem;
applying, at the matrix multiplication subsystem, a filter matrix to the data matrix via a matrix multiplication operation;
receiving, by the convolution raising subsystem, a result of the matrix multiplication operation;
using the result of the matrix multiplication operation to create an output volume of the convolution layer; and
rearranging the result in the output volume to restore the original convolution access pattern.

18. The method of claim 17, further comprising linearizing a set of weight matrices of the convolution layer to create the filter matrix that is applied to the data matrix.

19. The method of claim 17, further comprising:
retrieving the element of the additional patch from the reuse cache when performing the linearizing of the patch.

20. The method of claim 17, further comprises directly streaming the data matrix from a linearization subsystem to the matrix multiplication subsystem.

* * * * *